(12) United States Patent
Lemson et al.

(10) Patent No.: US 7,600,042 B2
(45) Date of Patent: Oct. 6, 2009

(54) DYNAMIC IP ADDRESS UPDATE

(75) Inventors: David E. Lemson, Redmond, WA (US); Kevin M. Brown, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/031,222

(22) Filed: Jan. 7, 2005

(65) Prior Publication Data

US 2006/0168164 A1 Jul. 27, 2006

Related U.S. Application Data

(63) Continuation of application No. 10/983,218, filed on Nov. 5, 2004.

(51) Int. Cl.
*G06F 15/16* (2006.01)
(52) U.S. Cl. ...................................... 709/245
(58) Field of Classification Search ................ 709/221, 709/224, 228, 245
See application file for complete search history.

(56) References Cited

U.S. PATENT DOCUMENTS

| 5,710,885 | A * | 1/1998 | Bondi ........................ 709/224 |
| 6,167,444 | A * | 12/2000 | Boden et al. ................ 709/223 |
| 6,247,055 | B1 * | 6/2001 | Cotner et al. ............... 709/227 |
| 6,560,634 | B1 | 5/2003 | Broadhurst |
| 6,865,594 | B1 * | 3/2005 | Belissent et al. ............ 709/206 |
| 6,980,990 | B2 | 12/2005 | Fellman |
| 7,359,987 | B2 * | 4/2008 | Stahura ...................... 709/245 |
| 2002/0091827 | A1 | 7/2002 | King |
| 2003/0050041 | A1 * | 3/2003 | Wu ............................. 455/406 |
| 2003/0229697 | A1 * | 12/2003 | Borella ....................... 709/226 |
| 2004/0167982 | A1 | 8/2004 | Cohen |
| 2004/0199608 | A1 | 10/2004 | Rechterman |
| 2006/0168164 | A1 | 7/2006 | Lemson |

FOREIGN PATENT DOCUMENTS

WO    WO 0215491    *   2/2002

OTHER PUBLICATIONS

Office Action dated Mar. 17, 2008 cited in U.S. Appl. No. 10/987,218.
Notice of Allowance dated Sep. 26, 2008 cited in U.S. Appl. No. 10/987,218.

* cited by examiner

*Primary Examiner*—Hassan Phillips
*Assistant Examiner*—Joseph L Greene
(74) *Attorney, Agent, or Firm*—Workman Nydegger

(57) ABSTRACT

The present invention provides for a configuration tool that during configuration of a message server assists a user in registering, transferring, maintaining a domain name and/or automatically configuring a message system in accordance therewith. The configuration tool guides the user through a series of inquiries, and based on the user input utilizes a list of registrars for registering a new domain name, configuring the system in accordance with an existing domain name, or transferring an existing domain name to a registrar within the list. The system then automatically configures the messaging server and other systems accordingly. Further, the system is configured to update a DNS for dynamic IP addresses corresponding to a domain name by periodically having the server send connection request to itself. This identifies when IP addresses associated with the domain name have changed, and thus the server may initiate the update of the DNS records.

10 Claims, 6 Drawing Sheets

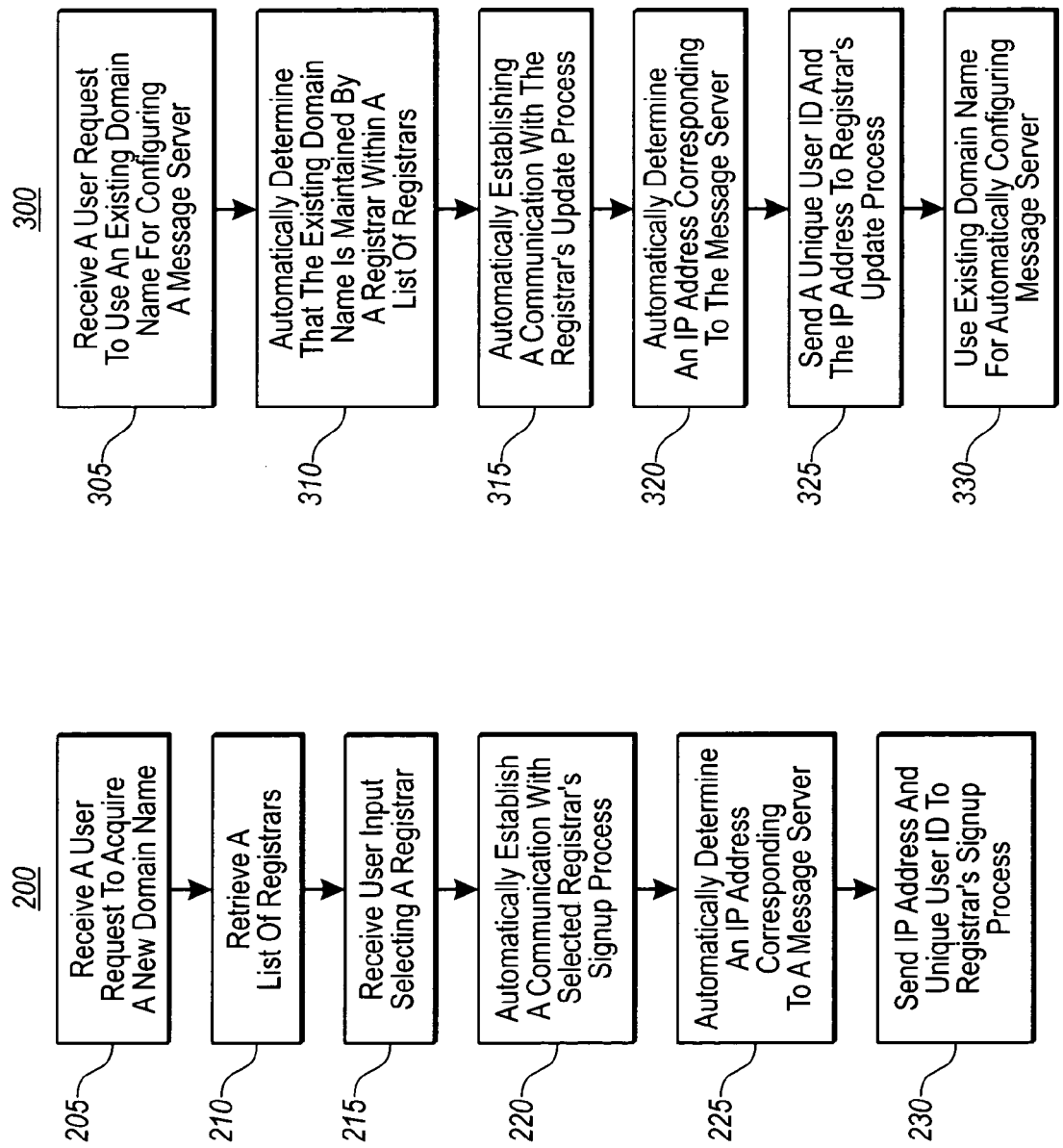

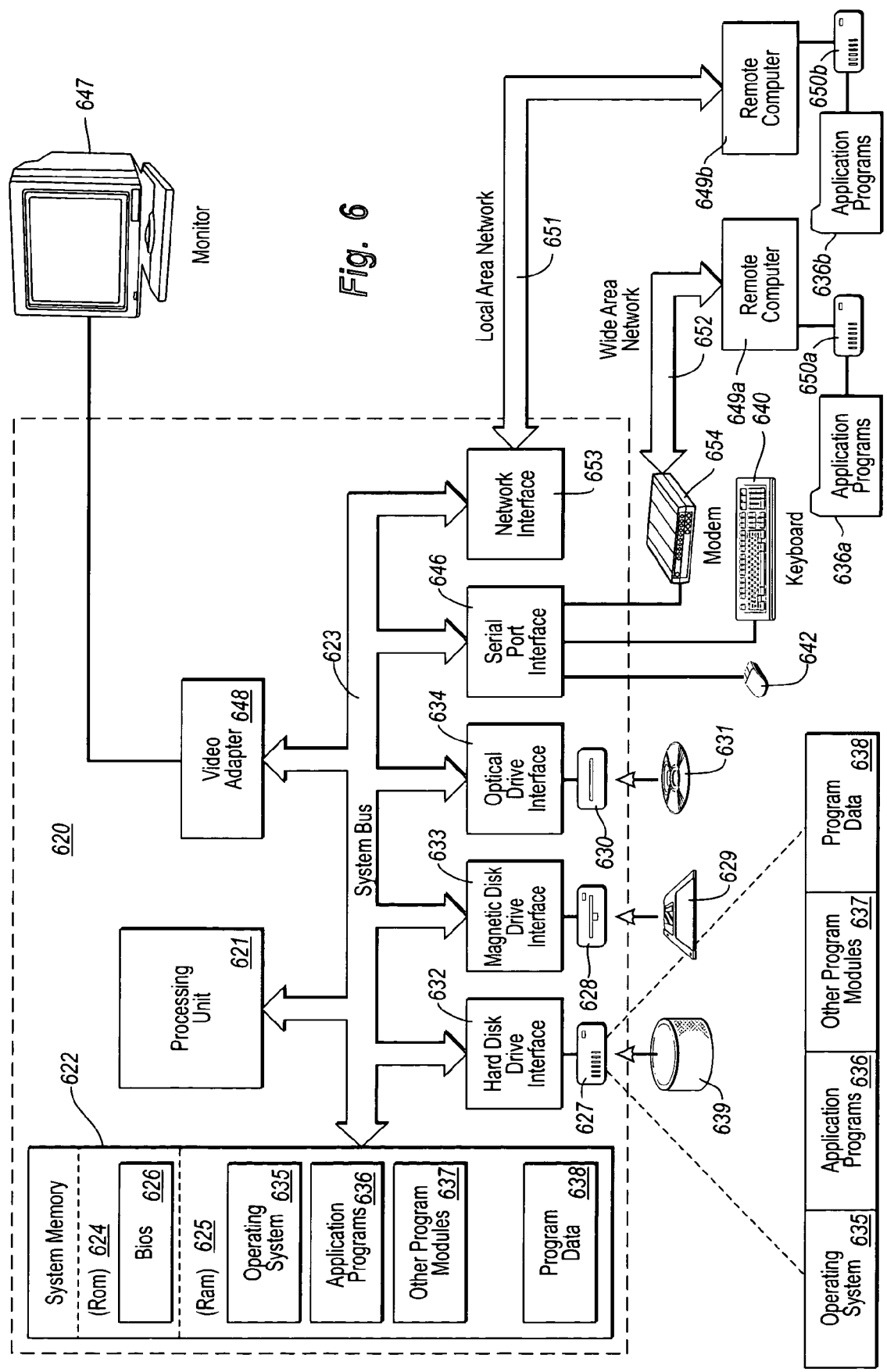

DYNAMIC IP ADDRESS UPDATE

CROSS-REFERENCE TO RELATED APPLICATIONS

This application is a continuation of U.S. patent application Ser. No. 10/983,218 filed on Nov. 5, 2004.

BACKGROUND OF THE INVENTION

1. The Field of the Invention

The present invention generally relates to configuring messaging servers. More specifically, the present invention provides for a configuration tool that assists the user in registering and maintaining either existing or new domain names with a domain name registrar.

2. Background and Related Art

Electronic messaging systems (e.g., e-mail, messaging boards, web services, etc.) have become an increasingly popular way to communicate. Business users increasingly rely on electronic messages to share ideas, transmit documents, schedule meetings and perform a multitude of other everyday tasks. In order to facilitate these tasks, a myriad of hardware and software components interact and communicate via numerous protocols such as the well-defined Internet Protocol (IP), often used in conjunction with the Transport Communication Protocol (TCP).

In order for such electronic messages to pass between computers over the Internet, each computer needs to have a unique Internet address in order to appropriately route messages. Typically, each computer is assigned a unique IP address so that no two machines have the same IP address. To simplify Internet addressing, the Domain Name System (DNS) allows users to access Internet resources with the simpler alphanumeric naming system.

Domain Name System as defined by a myriad of RFCs (see e.g., RFCs 1034, 1035) is a hierarchal database, meaning the data is structured in a tree much like the directory structure of typical operating system file structures. The root domain, ".", is at the top, and various sub-domains branch out from the root. On the Internet, for example, the first branches come out of the root are the top-level domains such as .com, which is a domain containing all commercial organizations, .edu, which contains all educational organizations, and the various country codes, like .au for Australia, .ca for Canada, and so on.

Under each of these top-level domains are more branches containing other domains, such as mycompany.com, under the .com domain, myschool.edu under the .edu domain, and so forth. Each of these domains may, in turn, have their own sub-domains, such as engineering.mycompany.com and sales.mycompany.com under the mycompany.com domain.

Each domain has its own name server, a server which contains host name information about the host and sub-domains within its domain. For example, mycompany.com domain may have a name server that stores address information about all of the host and sub-domains in the mycompany.com domain. Authority for a sub-domain, however, e.g., engineering.mycompany.com, can be passed to a name server that has authority for that sub-domain. When the name resolution request comes to the mycompany.com name server, it just passes the request off to the engineering.mycompany.com name server. In this way, DNS is truly distributed across the Internet, with each domain maintaining only the information that is pertinent to that domain.

Each name server stores information about its domain in the form of several different kinds of resource records, each of which stores a different kind of information about the domain and the host in the domain. For example, a Mail eXchange (MX) record stores information about where mail for the domain should be delivered. The "A" record, on the other hand, stores the host name and IP addresses of individual hosts in the domain. This is the record used to translate host names to IP addresses.

Typically, individuals and many small businesses use an Internet Service Provider (ISP) for email and Internet access. The ISP usually issues the domain name and assigns IP addresses. In order to save money and effort, typically the ISPs issue dynamic addresses using, for example, Dynamic Host Configuration Protocol (DHCP). Accordingly, many individuals and small businesses end up with dynamic IP addresses, which are managed by the ISP for updating DNS records.

Rather than using an ISP, more and more businesses are desiring to have more choices and control over their domain names. Additionally, many businesses prefer to run their own messaging servers in order to have increased functionality and control. Accordingly, many businesses nowadays configure their own messaging servers, assign static (or dynamic) IP addresses and update the DNS records much like an ISP provider would do. In order to configure such messaging systems, however, businesses need to first acquire the rights to the domain name. Typically, this is a manual process in that a user setting up the server must find an appropriate registrar to purchase the domain name, query the registrar for the availability of such, and pay a fee if such domain name is available. The user must then take this information, determine the IP address corresponding to their server, and update the server and the DNS records accordingly.

While this process may seem simple, most small business users find it difficult not only to determine the appropriate registrar to use for the domain they desire, but also find it difficult to configure the messaging server and the DNS records. Accordingly, there exists a need for an automated system that would assist a user in obtaining a new, or even using an existing, domain name during the configuration of a messaging server.

Further, small business users that use dynamic IP addresses utilizing, e.g., such protocols such as DHCP, need to be aware when IP addresses have been changed in order to appropriately maintain the DNS records. Although current mechanisms can be used to update DNS records, these systems are typically brute force type systems—i.e., they simply periodically obtain the IP address from the network card and logon to a service provided by the DNS provider to update the records. This periodic updating, however, creates a heavy burden on the DNS provider's server.

For example, if the provider has a large number of domain names to manage, continually signing on and updating DNS records can create a heavy burden on the limited processing resources of these systems. In addition, the user setting up the messaging server that has a dynamic IP may not know about such systems, or even where to find them. Even worse, the user setting up the messaging server may not know that they have a dynamic IP address, or that they need to do anything special because of that fact. Accordingly, there also exists a need for lightweight system that can automatically be configured during setup of a messaging server for maintaining dynamic IP addresses.

BRIEF SUMMARY OF THE INVENTION

The above-identified deficiencies and drawbacks of current messaging systems are overcome by exemplary embodiments of the present invention. For example, the present invention provides for a configuration tool that assists the user in registering, transferring and maintaining a domain name and automatically configuring the messaging system in accordance therewith.

In one example embodiment, a user request to acquire a new domain name corresponding to a top-level domain extension is received. Based on the top-level domain extension, a list of registrars capable of registering the new domain name is retrieved. Next, user input is received for selecting a registrar from among the list of registrars for registering a desired domain name. Based on the selected registrar, a communication with the selected registrar's signup process is automatically established. Further, an IP address corresponding to a message server is automatically determined, which is used for configuring records of the domain name server. The IP address and a unique user identifier are then sent to the registrar's sign-up process.

In another example embodiment, a user request to use an existing domain name for configuring a message server is received. The existing domain name corresponding to a top-level domain extension. Next, the system automatically determines the existing domain name is maintained by a registrar from among a list of registrars. Each registrar in the list being capable of interacting with a configuration tool used to configure the message server. A communication with the registrar's update process is automatically established and an IP address corresponding to the message server is automatically determined, which is used for configuring records of a domain name server. A unique user identifier and the IP address are then sent to the registrar's update process and the existing domain name can be used for automatically configuring the message server.

In yet another example embodiment, a user request to use an existing domain name for configuring a message server is received, wherein the existing domain name corresponds to a top-level domain extension. In this embodiment, it is automatically determined that the existing domain name is not managed by a registrar from among a list of registrars. Each registrar within the list being capable of interacting with the configuration tool used in configuring the message server. Nonetheless, based on the top-level domain extension for the existing domain name, one or more registrars from the list of registrars are retrieved, wherein the one or more registrars are capable of maintaining the existing domain name. User input is then received selecting a registrar from among the one or more registrars for transferring the existing domain name. Based on the selected registrar, a communication with the selected registrar's transfer process is automatically established and an IP address corresponding to the message server for configuring records of a domain name server is automatically determined. Next, a unique user identifier and the IP address are sent to the selected registrar's transfer process and an indication is presented to the user that the transfer of registrars has been initiated.

In yet another example embodiment, the present invention provides for efficiently maintaining a domain name server record for a domain name with a dynamic IP address by a periodic process that utilize a domain name system in determining when an IP address has changed. A domain name corresponding to the message server is identified and a connection request addressed to the domain name is sent from the server. After a predetermined period of time without receiving the connection request at the message server, it is determined that an EP address corresponding to the domain name has changed. Accordingly, a new IP address corresponding to the domain name can be determined and sent to a server for updating one or more records that map the domain name to an IP address such that messages are appropriately routed to the message server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an example flow chart of a method of assisting a user in registering a new domain name with a domain name registrar in accordance with example embodiments;

FIG. 3 illustrates a flow chart of a method for utilizing a configuration tool for configuring a messaging system using an existing domain name in accordance with example embodiments;

FIG. 6 illustrates an example system that provides a suitable operating environment for the present invention.

DETAILED DESCRIPTION OF THE PREFERRED EMBODIMENTS

The present invention extends to methods, systems and computer program products for registering, transferring or otherwise maintaining a domain name during the setup of a messaging server. The embodiments of the present invention may comprise a special purpose or general-purpose computer including various computer hardware, as discussed in greater detail below.

The present invention provides for a configuration tool, e.g., wizard like tool, wherein during the configuration of a server (e.g., a mail server, web server, etc.) the configuration tool can be used to assist the user in acquiring, transferring, managing and/or maintaining a domain name. Depending upon whether the user has an existing domain name, or wishes to acquire a new domain name for configuring the server, example embodiments provide for different processing features for accommodating the user's needs. Furthermore, if dynamic IP addresses are used, the present invention provides for a systematic way of efficiently maintaining or updating the IP address at a domain name server, i.e., updating the DNS records, accordingly.

Figure 1A:
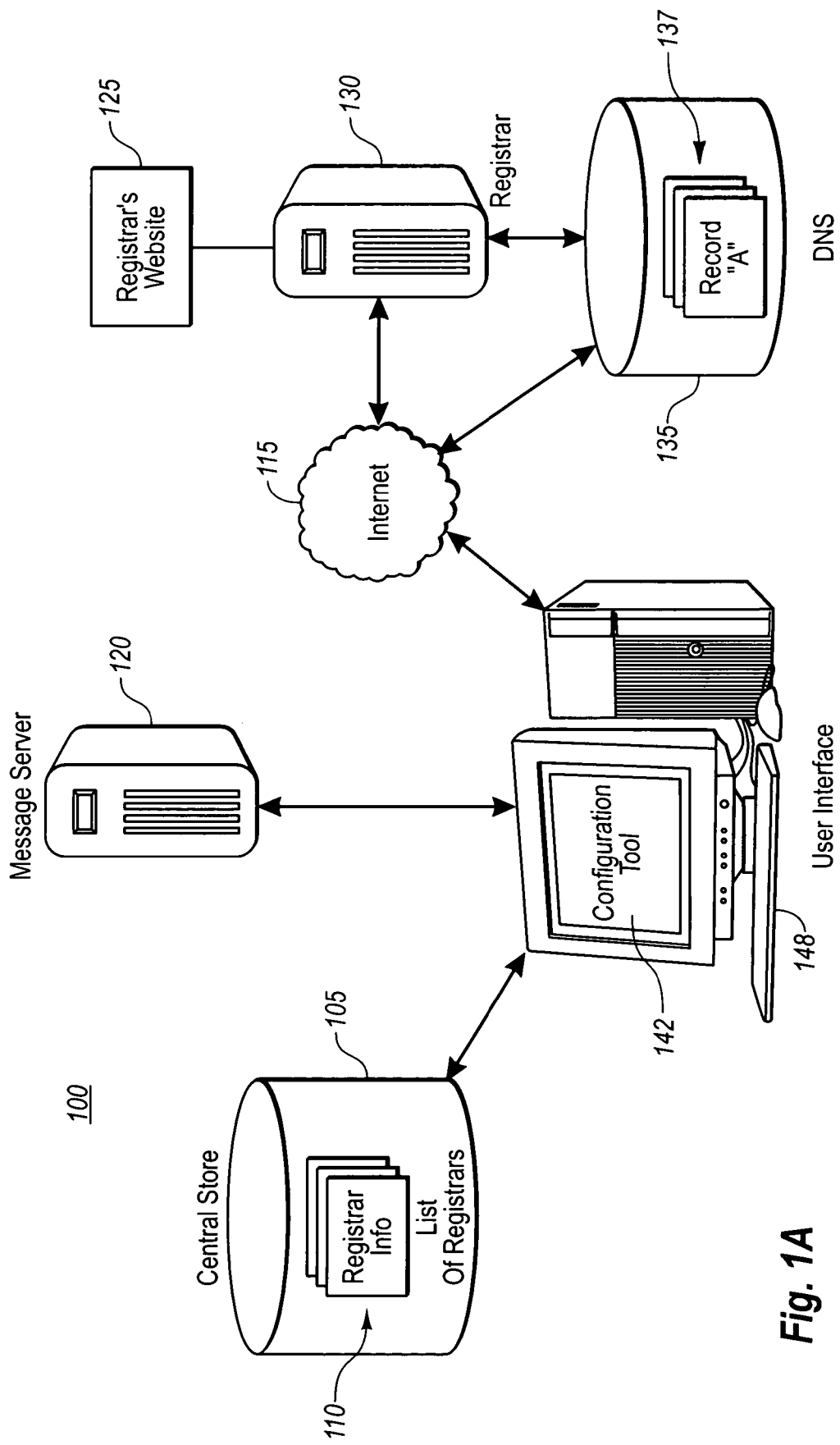
FIG. 1A illustrates a messaging system with a configuration tool for assisting a user in registering, transferring, or otherwise maintaining a domain name in accordance with example embodiments of the present invention.
Figure 1B:
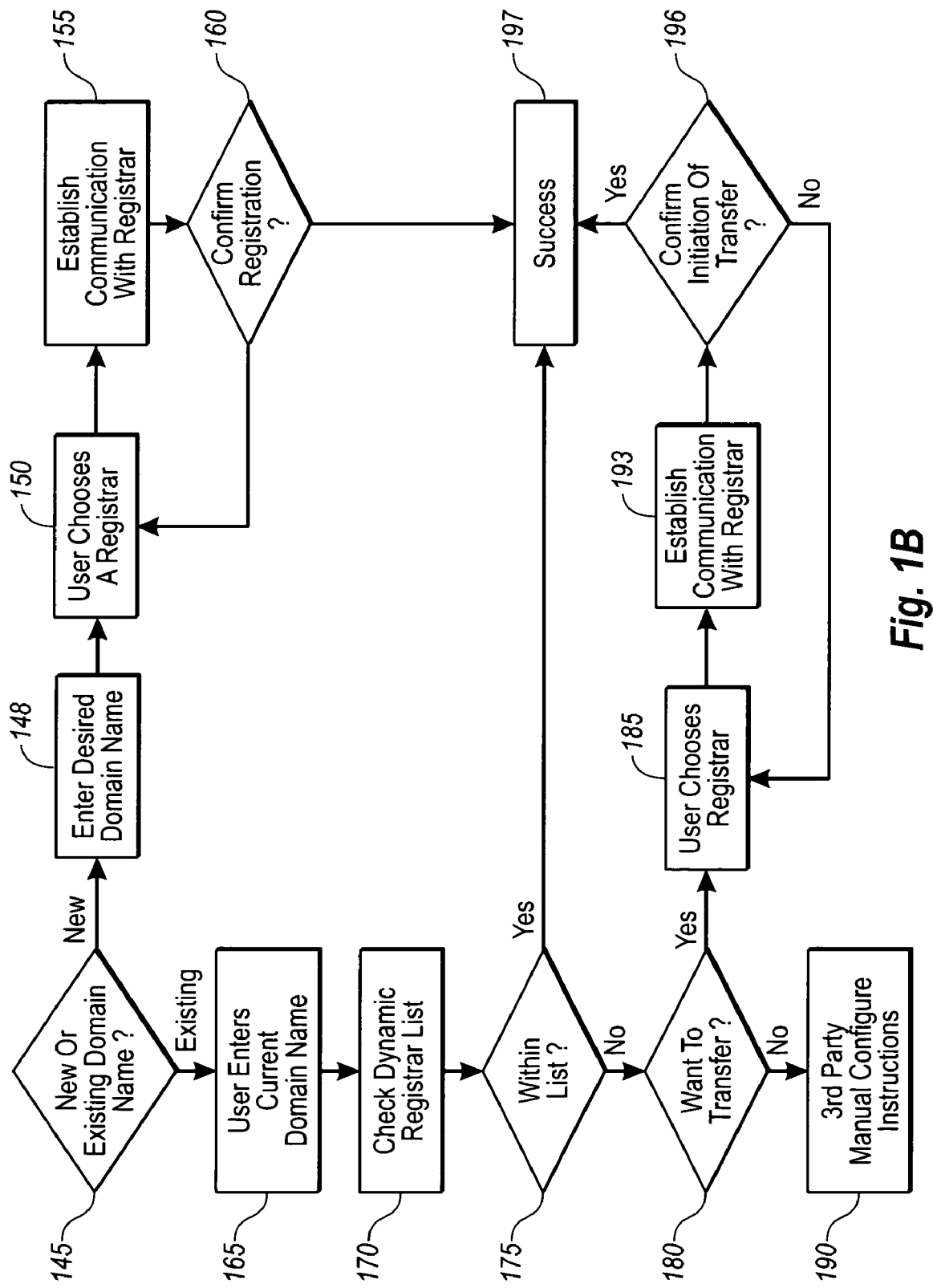
FIG. 1B illustrates a flow diagram for the configuration tool in accordance with example embodiments of the present invention.

FIG. 1B illustrates a flow diagram for the configuration tool, whereas FIG. 1A illustrates an example messaging system configured for use in the present invention. When going through the flow diagram of FIG. 1B, reference will occasionally be made to elements within FIG. 1A. Although a reference may be made to a specific element in FIG. 1A, the elements mentioned are used for illustrative purposes only and are not meant limit or otherwise narrow the scope of the present invention unless explicitly claimed.

Starting in the upper left corner of FIG. 1B, the configuration tool (142 in FIG. 1A) may prompt a user (using e.g., wizard like pages) for an indication as to whether the user would like to use a new or existing domain name, as shown in 145. If the user chooses to use a new domain name the flow diagram of FIG. 1B moves to the right 148. There the user is prompted using the configuration tool 142 to enter a new or desired domain name. Accordingly, the user can use the user interface 148 to input the desired domain name including the top-level domain extension. This top-level domain extension may be any one of a myriad of representations, e.g., a commercial organization of ".com," an educational organization of ".edu," a country code, e.g., ".au," a non-profit organization of ".org," a government organization of ".gov," a military organization ".mil," a network provider of ".net," etc. Note that there are numerous top-level domain extensions based on varying country codes and organizations. Accordingly, the above referenced list of top-level domain extensions is used for illustrative purposes only and is not meant to limit or otherwise narrow the scope of the present invention unless explicitly claimed.

Based upon the top-level domain extension for the domain name, example embodiments provide for accessing a centralized expandable database or store 105 for retrieving a list of registrars 110, which are capable of registering the new or desired domain name. This list of registrars 110 will typically be a "special" registrar in that configuration tool 142 can connect to registrar 130 and communicate therewith in accordance with proprietary protocols. Further, the list of registrars 110 may be a dynamic list in that registrars can be added and deleted as needed, and the proprietary protocols used can also be updated or changed (using, for example, an eXtensible Markup Language (XML) document). Note, however, that the list of registrars may be hard coded or baked into the configuration tool 142, thereby making the list difficult to change. Accordingly, the present invention is not limited to just a dynamic list of registrars; and as such, the term "registrar list" as used herein should be broadly interpreted to mean both dynamic and static unless otherwise explicitly claimed.

Further, note that example embodiments provide for presenting the user with only a select number of registrars (not the entire list of registrars 110) in order to present only viable options. Note also that other example embodiments provide for a permanent URI identified by the configuration tool 142 for accessing the central store 105, such that the configuration tool does not need to be updated over time as changes are made to the list of registrars 110. The present invention, however, is not limited to just presenting a select number of registrars or utilizing a permanent URI for accessing the central store 105. Accordingly, the use of these features are for illustrative purposes only and are not meant to limit or otherwise narrow the scope of the present invention unless explicitly claimed.

In addition, although the dynamic central store 105 is shown separate from configuration tool 142 and message server 120, and is connected via direct link, other configurations and topologies are available. For example, typically configuration tool 142 will access the central store 105 via the Internet 115. In the case where the registrar is a static list, however, the central store may be part of the configuration tool 142. As such, any configuration or topology depicted or discussed in the Figures and the detailed description are used for illustrative purposes only and are not meant to limit or otherwise narrow the scope of the present invention.

Regardless of the various topologies and features used, once configuration tool 142 has retrieved the list of registrars 110, this list of registrars 110 is presented to the user at the user interface 148. Accordingly, the flow diagram of FIG. 1B moves to block 150 where the user chooses a registrar from the list 110. Based on the selected registrar, flow diagram moves to 155 for automatically establishing a communication with the registrar. For example, configuration tool 142 upon receiving user input selecting registrar 130 can use the registrar information within the central store 105, e.g., a URI or other similar communication identifier, and automatically establish a communication therewith.

In one example embodiment, this established communication generates or launches a registrar's signup website 125 which is presented at the user interface 148. Typically, the registrar's signup website launched 125 would not be the ordinary website that one would view if they would to go directly to the registrar's signup process without the configuration tool 142. That is, example embodiments provide that registrar's website 125 will conform to proprietary queries and protocol corresponding to the configuration tool 142 in order to enhance the user experience. In this embodiment the user is prompted at the registrar's signup website 125 for such information as billing address, the payment information, the username or company name, etc. Further, either the configuration tool 142 or the user itself may provide the registrar 130 with the desired or new domain name. Note that if the desired new domain name is already registered, the registrar 130 may present the user with a list of alternative domain names available, whereupon the user can select one of the alternative domain names or input another desired one. This process will continue until an available domain name is appropriately chosen by the user.

In other example embodiments, as part of the communication with the registrar the configuration tool 142 automatically (i.e., on behalf of the user) identifies the IP address associated with the message server 120 and transfers it to the registrar. In this embodiment, and as described in greater detail below, the registrar upon successful registration of the desired domain name may pass this IP address and the domain name to DNS 135 for creation of the appropriate records 137 (e.g., MX record, A record, etc.). Of course, other well known ways for creating and storing the appropriate records 137 in the DNS 135 are also available to the present invention, for example, using a direct connection to the DNS with the configuration tool 142 via the Internet 115. Accordingly, the above described creating and storing of the DNS records via the registrar is used for illustrative purposes and is not meant to limit or otherwise narrow the scope of the present invention unless explicitly claimed.

Note that in another example embodiment, a unique identifier (e.g., a Global Unique Identifier (GUID)) is also sent for future referencing the user in subsequent communication with the registrar, as described in greater detail below. Moreover, a secret may be shared between the registrar 130 and the configuration tool 142 for authenticating the configuration tool 142 to the registrar 130 in subsequent communications, as described below. Of course, other well known ways of uniquely identifying the user and authenticating the configuration tool 142 are also available to the present invention.

Once all the appropriate information is received by registrar 130, the user will then close out of the signup website 125 and proceed to the next step in the configuration tool 142. At this juncture, the configuration tool 142 moves to the confirm registration 160 in FIG. 1B to determine if indeed the user appropriately acquired the desired domain name. According, configuration tool 142 will again establish communication with the registrar 130 and use the unique identifier described above (and possibly authenticate itself as previously discussed) for inquiring whether or not the user appropriately registered the domain name.

If the user did not appropriately acquire the desired domain name for whatever reason (e.g., improper information), example embodiments provide for sending the user back through the configuration tool 142 to block 150 where a user can choose the same or another registrar 130. Otherwise, if the registration is confirmed, the configuration tool 142 moves to a successful 197 registration, wherein configuration of the message server 120 with the appropriate domain name information can automatically be performed. The user is then guided through the remaining, if any, portion of the setup process for the message server 120.

In another example embodiment, rather than launching the registrar's signup website 125 controlled by the registrar 130, all the information flows through the configuration tool 142. That is, the configuration tool can have embedded within it pages that prompt the user for the appropriate information needed (as described above) for completing the registration of the desired domain name. The configuration tool 142 can then pass this information via, e.g., calls over the Internet 115 to the registrar 130. In this example embodiment, the user is totally abstracted from the established communication with the registrar's signup process, thereby enhancing the user experience even further. Moreover, the configuration tool 142 may automatically receive feed back from the registrar confirming the registration as described above with reference to block 160, without have to establish another communication with the Note also that in another embodiment, the use of the configuration tool 142 for abstracting the user from the established communication with the registrar 130 allows for localized experience not available through the registrar's website 125. For example, if the registrar corresponds to a foreign country where typically the website 125 would bring up a foreign language unfamiliar to the user, the configuration tool 142 may translate the required information for registration to the language desired by the user. Of course, other localized features, such as lay out of pages and other configuration information, are also available to the present invention. Accordingly the use of the localization feature for converting languages is used for illustrative purposes only and is not meant to limit or otherwise narrow the scope of the present invention.

Regardless of weather the configuration tool 142 abstracts the user from the established communication with the registrar 130, or whether the configuration tool 142 launches a web site for the domain name registration, further example embodiments allow for automatically obtaining an Secure Sockets Layer (SSL) certificate using the newly confirmed domain name. Such SSL certificates are used for authenticating the user to a web or mail server. Embedded or encoded within each SSL certificate is the user' domain name, which needs to be confirmed or validated by a SSL certificate authority (i.e., the entity that issues the SSL certificate). Because the newly obtained domain name has been confirmed in 160, example embodiments leverage this fact and may automatically obtain or purchase an SSL certificate during setup of the server.

Going back to the upper left-hand corner of the flow diagram in FIG. 1B, if the user desires to use an existing domain name from query 145, the flow proceeds downward to block 165 where the user can enter the current domain. Once the domain name is entered into the configuration tool 142, the list of registrars 110 may be checked in box 170 for determining if the domain name was registered to one of the registrars within the list of registrars 110. For example, configuration tool 142 can query each of the registrars 130 within the list of registrars 110 for determining if the domain name is registered at one of these registrars 130. Of course, the query can be expedited by noting the top-level domain extension and contacting only registrars that can assign this type of extension. Alternatively, a lookup to specific database server may be made to determine which registrar the domain is registered with.

Next from flow diagram FIG. 1B in block 175, if one of the registrars within the registrar list 110 registered the domain name, then configuration tool 142 moves directly on to a success block 199 where the configuration tool 142 assists the user in completing the configuration of the message server 120 and DNS 135, similar to the process described above. If on the other hand, the domain name was not registered to any of the list of registrars 110, we proceed in the flow diagram to query whether or not the user wants to transfer 180 the domain name to one of the registrars within the dynamic (or static as the case may be) list of registrars 110. In such instance, configuration tool 142 can point out the benefits of the automated process offered for updating the DNS records 137 and configuring the message server 120 appropriately. Further, as discussed in greater detail below, the user may be informed of the added advantage of being able to maintain the DNS records 137 if the domain name has a dynamic IP address.

If the user does not want to transfer domain names in 180, the configuration tool 142 moves to block 190 in the flow diagram, which simply presents third party manual configuration instructions, similar to current server systems today. If on the other hand, the user desires to transfer the domain name to one of the registrar's within the list 110 the flow diagram moves to the right at block 185. Similar to the process for a new domain name described above, the user is then presented with a list of registrars 110, based again, e.g., on the top-level domain extension, where user can then choose a registrar. Once chosen, configuration tool 142 again moves to the right to block 193 for automatically establishing communication with the registrar 130. Similar to before, this communication may launch a registrar's transfer website 125 or maybe the communication is fully controlled by the configuration tool 142 such that the user is abstracted from the registrar's transfer process.

Unlike the new registration, however, because the transfer of a domain name from one registrar to another may take up to several days, only an indication that the transfer of the registrar has been initiated is given at the user interface 148. Some information, however, may be confirmed. For example, as shown in block 196, confirmation of the initiation of transfer is shown in block 196 where configuration tool 142—depending upon whether a transfer website 125 is launched or whether the configuration tool 142 itself obtains the data, as previously discussed—can either take the user back to choose a registrar in 185 or move on to a successful transfer 197 as appropriate. That is, some information (such as credit card payment approval, appropriate billing address, etc.) may be confirmed and based on this information the configuration tool 142 can configure the message server 120 accordingly and move the user through the rest of the signup process, if any.

Other example embodiments also provide for maintaining the domain name server records 137 for domain names with dynamic IP addresses. By utilizing the domain name's message server 120, this example embodiment may periodically determine when an IP address has changed, and update it accordingly.

For example, after the system has been appropriately configured or setup, the message server is automatically set to detect changes in DNS records (e.g., the A record 137 that points to the IP address). Accordingly, the present invention provides for allowing the message server to send a connection request destined with its domain out over the Internet 115 and then routed through the DNS 135. In other words, the message server 120 is attempting to establish a connection (e.g., a SMTP connection) to itself using its domain name rather than its IP address. If after a predetermined period of time the message server 120 does not receive the connection request back, it can be concluded that the IP address may have changed; and therefore the DNS 135 probably routed the connection request elsewhere. At this point, the message server 120 can determine the new IP address (either via the registrar 130 or through direct communication with the DNS 135, as previously described) This new IP address may then be sent to a server, e.g., a web server, which then updates a database that updates the appropriate DNS records 137 accordingly. Note that similar to above, the server may use the unique identifier and a password or other shared secret to identify the appropriate records and authenticate the server's 120 ability to access and change such records 137.

The time lapse for the periodic sending of messages for determining if the IP address has changed as described above may be configurable. This feature is especially important in making sure that the DNS records 137 are updated frequently enough that messages are not inappropriately routed. Yet, the overall process is efficient in that the burden on the DNS 135 associated with continual update of the records 137 when unnecessary is avoided. More specifically, by the server simply sending messages to itself and verifying only those instances when the IP address has actually changed for updating the DNS, the resources of the DNS are preserved. Further, the lightweight pinging the server performs is only a very small burden on itself, and the total load on the DNS for updated purposes can be distributed throughout all severs in the system.

The present invention may also be described in terms of methods comprising functional steps and/or non-functional acts. The following is a description of steps and acts that may be performed in practicing the present invention. Usually, functional steps describe the invention in terms of results that are accomplished, whereas non-functional acts describe more specific actions for achieving a particular result. Although the functional steps and non-functional acts may be described or claimed in any particular order, the present invention is not necessarily limited to any particular ordering or combination of acts and/or steps. Further, the use of acts and/or steps in the recitation of the claims and in the following description of the flow charts for FIGS. 2-5 are used to indicate the desired specific use of such terms.

FIGS. 2-5 illustrate example flow charts for various exemplary embodiments of the present invention. The following description of FIGS. 2-5 will occasionally refer to corresponding elements from FIG. 1A. Although reference may be made to a specific element from FIG. 1A, such elements are used for illustrative purposes only and are not meant to limit or otherwise narrow the scope of the present invention unless explicitly claimed.

FIG. 2 illustrates an example flow chart of a method 200 for automatically configuring system devices such that messages corresponding to a new domain name can be appropriately routed by utilizing a configuration tool that assists a user in registering the new domain name with the domain name registrar. Method 200 includes an act of receiving 205 a user request to acquire a new domain name. For example, configuration tool 142 may receive through user interface 148 an indication that a user which is to acquire a new domain name when configuring message server 120. The user may use the user interface 148 for entering a desired new domain name corresponding to a top-level domain extension. The top-level domain extension may represent one or more of a commercial organization, an educational organization, a country code, a non-profit organization, a governmental organization, a military, organization, a network provider, etc. Further, the message server 120 may be an email server, web server, instant messaging server, etc.

Based on the top-level domain extension, method 200 further includes an act of retrieving 210 a list of registrars. For example, configuration tool 142 may retrieve a list of registrars 110 from central store 105 based on the top-level domain extension of the desired new domain name. Example embodiments provide that the central store 105 may be an extendable database identified using the configuration tool 142 through a permanent URL or URI such that the configuration tool does not need to be updated over time as changes are made to the list of registrars. Further, this list of registrars 110 may be a dynamic list in that the list 110 can be continually updated as need, or the list 110 may be static and hard coded in the configuration tool 142. If the list of registrars 110 is dynamic (or even if the list is static), it may be in an XML format.

Method 200 also includes an act of receiving 215 user input selecting a registrar. For example, user can use user interface 148 for selecting a registrar from among the lists of registrars 110 for registering a desired domain name. Based on the selected registrar, method 200 further includes an act of automatically establishing 220 communication with the selected registrar's signup process. For example, configuration tool 142 can retrieve registrar info corresponding to the selected registrar and connect to the registrar's signup process over, e.g., the Internet 115.

As previously mentioned, this established communication with the selected registrar signup process may include launching a registrar signup website 125 unique to the configuration tool 142, wherein the user inputs information including such things as billing address, desired domain name, payment information, username, company name, etc. Alternatively, the established communication might be a UI 148 of the configuration tool 142 that abstracts the user from the established communication with the registrars 130's signup process. In such instance, the configuration tool 142 will receive such information as payment, domain name, billing address, etc., which can then be sent as registration information to the registrar's setup process. Based on the registration information, and based on other information as described hereinafter, configuration tool 142 may receive an indication from the registrar 130 for either success or failure of the registrar's signup process.

Method 200 also includes an act of automatically determining 225 an IP address corresponding to a message server. For example, configuration tool 142 may be able to identify the IP address of the message server 120, which is used for configuring records 137 of the domain name service 135. Next, method 200 includes an act of sending 230 the EP address and a unique user identifier to registrar signup process. A unique identifier used to identify the domain name or more particularly the user in subsequent communications between the configuration tool 142 and the registrar 130. The IP address may be then passed to the DNS 135 to update records 137 appropriately or in this case generate them for a new domain name.

Along with the IP address and unique user ID the configuration tool 142 may pass or establish a shared secret with registrar 130 in order to authenticate itself in subsequent communications—for example, when verifying that the user indeed in fact purchase or acquired the appropriate domain name when.

In the event that the new domain name is unavailable, the present invention provides for receiving a list of alternative domain names based on the new domain name. The list may be presented to the user, whereupon a user may select a desired domain name from among the list of alternative domain names. If the user is abstracted from the communication with the registrar, the desired domain name may then be sent to the registrar 130 for completing the registrar's signup process.

If the established communication launches the registrar's signup website 125, when an indication that the user has finished using the registrar's signup process 125 is received, a connection for the registrar for identifying the user by the unique identifier is established. The secret generated during the act of automatically establishing the connection may then be used for authenticating to the registrar. After authentication, the configuration tool 142 may query as to whether or not the user appropriately attained the desired domain name. Upon verification of the acquired or desired domain name, the desired domain name may be used for automatically configuring the message server 120. Further, the IP address may be sent to the registrar's signup process for assist in setting up a MX record 137 and/or an A record 137 that points to the IP address—both of which reside on the domain name server 135.

FIG. 3 illustrates an example flow chart of a method 300 of automatically configuring system devices such that messages corresponding to an existing domain name can be appropriately routed to a message server. Method 300 includes an act of receiving 305 a user request to use an existing domain name for configuring a message server. For example, configuration tool 142 may receive at the user interface 148 an indication that the user wishes to use an existing domain name. Method 300 also includes an act of automatically determining 310 that the existing domain name is maintained by a registrar within a list of registrars. For example, configuration tool 142 may query the list of registrars 110 based on, e.g., the top-level domain extension, to determine whether or not the domain name was registered with one of the registrars within the list 110.

As previously mentioned, the top-level domain extension may represent one or more of a commercial organization, an educational organization, a country code, a non-profit organization, a governmental organization, a military organization, a network provider, etc. Further, the message server 120 may be a email server, web server, instant messaging server, etc. Moreover, this list of registrars 110 may be a dynamic list in that the list 110 can be continually updated as need, or the list 110 may be static and hard coded in the configuration tool 142. If the list of registrars 110 is dynamic (or even if it is static), it may be in an XML format.

Method 300 also includes an act of automatically establishing 315 a communication with the registrars update process. For example, configuration tool 142 from determining the appropriate registrar 130 may establish communication with registrar 130 for updating DNS records 135 with the appropriate IP and other information. Accordingly, method 300 includes an act of automatically determining 320 an IP address corresponding to the message server. Further, method 300 includes an act of sending 325 a unique user identifier and the IP address to the registrars update process. The IP address sent to the registrar's update process assists in setting up a MX record 137 and/or an A record 137 that points to the IP address—both of which reside on the domain name server 135. Finally, method 300 includes an act of using 330 the existing domain name for automatically configuring message server. For example, configuration tool 142 can use the existing domain name to automatically update message server or to configure message server 120 as appropriate.

Figure 4:
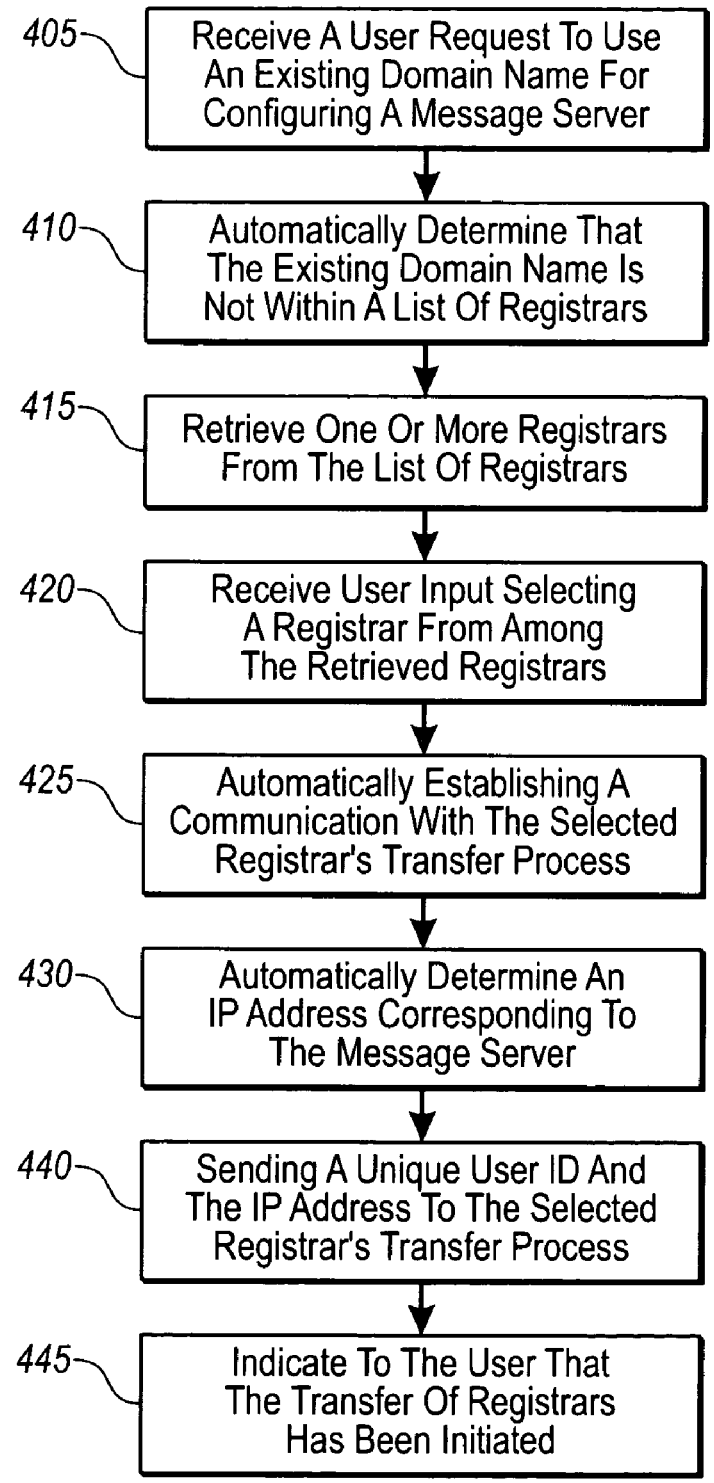
FIG. 4 illustrates a flow chart of a method for assisting a user in transferring registrars used to maintain a domain name in accordance with example embodiments.

FIG. 4 illustrates a method 400 of automatically configuring system devices such that messages corresponding to an existing domain name can be appropriately routed to a message server by utilizing the configuration tool that assists a user in transferring registrars used to maintain the domain name. Method 400 includes an act of receiving 405 a user request to use an existing domain name for configuring a message server. That is, similar to above, configuration tool 142 can receive at user interface 148 an indication that the user desires to use an existing domain name. In contrast to method 300, method 400 includes an act of automatically determining 410 the existing domain name is not within a list of registrars. For example, configuration tool 142 after scanning or querying the list of registrars 110 may determine that the domain name was not registered with any registrar within the list 110.

In this flow chart, it is assumed that the user then desires to transfer the domain name from one registrar to a registrar within the list of registrars 110. Accordingly, method 400 includes an act of retrieving 410 one or more registrars from the list of registrars. That is, similar to above, configuration tool 142 can retrieve a sub-list of registrars 110 based on the top-level domain extension for the existing domain name. This top-level extension may be associated with a .com, .net, .edu, .org, or even country code. Further, other elements as previously described above regarding the retrieval of the list 110 and properties associated therewith are also available to the present method 400.

Method 400 also includes an act of automatically establishing 425 a communication with the selected registrars transfer process. Similar to method 200, the communication establish may launch a registrar's transfer website 125 for gathering information needed to complete the transfer to the registrar 130, or configuration tool 142 may abstract the user from the registrar's transfer process and prompt the user for the appropriate information and make calls to the registrar for passing this information. In such instance, the configuration tool 142 will receive such information as payment, domain name, billing address, etc., which can then be sent as information to the registrar's transfer process.

Method 400 also includes an act of automatically determining 430 an IP address corresponding to the message server. Further, method 400 includes an act of sending 440 a unique user identifier and the IP address to the selected registrars transfer process. That is, similar to method 200 and 300, configuration tool 142 can determine the IP address of message server 120 and send this information along with a unique user identifier for subsequent communications to the registrar 130. Finally step 400 includes an act of indicating 445 to the user that the transfer of registrars has been initiated. That is, because the transfer may take several days, only an indication that it has been initiated may be given to the user. Although such things as billing address, desired domain name, payment information, username, company name, etc. may be verified as described above.

Figure 5:
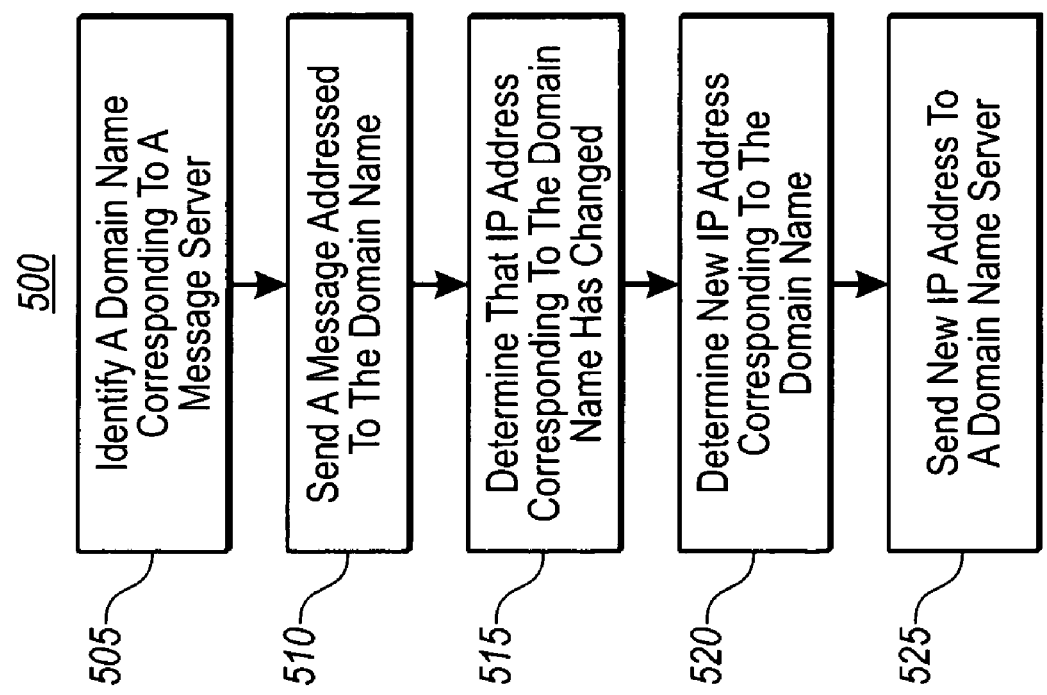
FIG. 5 illustrates a flow chart of a method of efficiently maintaining a domain name server record for a domain name with dynamic IP address in accordance with example embodiments.

FIG. 5 illustrates an example flow chart of a method 500 of efficiently maintaining a domain name server record for a domain name with a dynamic IP address by utilizing the domain name's message server in determining when an IP address has changed. Method 500 includes an act of identifying 505 a domain name corresponding to a message server. Method 500 also includes an act of sending 510 a connection request to the domain name. For example, message server 120 can generate a connection request addressed to its domain name and send it across the Internet 115 to see if the connection request comes back to message server 120. In other words, the message server 120 sends the connection request to itself.

After a predetermined time without receiving the connection request at the message server, method 500 also includes an act of determining that the IP address corresponding to the domain name has changed. In such instance, method 500 includes an act of determining 520 a new IP address corresponding to the domain name. Finally method 500 includes an act of sending 525 the new IP address to a server. For example, message server 120 after determining the IP address corresponding to its domain name has changed may determined the new IP address and send it to a server for updating the appropriate DNS records 137, e.g., the A record.

The above process or method for 500 may be automatically programmed during setup. Further the new IP address may be routed to the DNS 135 through the registrar 130 when message server 120 makes a call to the registrar' update process. In either instance, a password or shared secret may be used to authenticate the message server 120 to either the domain name server 135 or the registrar 130. As mentioned above, the message server may be a web server, mail server or any other type messaging server.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a messaging system including a message server, a method of the message server maintaining a domain name server record for a domain name of the message server, the domain name having a dynamic IP address, wherein the value of dynamic IP address can change causing a DNS record for the domain name to be incorrectly mapped to a computer system other than the message server, the method including acts of:

the message server automatically determining that the value of the dynamic IP address for the domain is no longer appropriately mapped to the domain name corresponding to the message server, including:

the message server identifying the domain name corresponding to the message server;

the message server sending a connection request addressed to the domain name, the connection request sent to the domain name to determine if the message server receives back the connection request, receiving back the connection request indicating that a previously assigned value for the dynamic IP address is appropriately mapped to the domain name in the DNS record for the domain name, sending the connection request being an attempt by the message server to send the connection request to the message server itself to determine if the previously assigned value assigned to the dynamic IP address has changed; and after a predetermined time without receiving the connection request at the message server, determining that the previously assigned value of the dynamic IP address corresponding to the domain name has changed;

the message server determining a new value for the dynamic IP address corresponding to the domain name;

the message server sending the new value for the dynamic IP address to a registrar for updating the DNS record for the domain name such that messages are appropriately routed to the message server when messages are sent to the domain name, the registrar previously selected from among a plurality of registrars retrieved by an automatic configuration tool from a centralized database, the centralized database for a top-level domain in which the domain name is included.

2. The method of claim 1, wherein sending the new value for the dynamic IP address to a registrar comprises sending the new IP address to a registrar, which routes the IP address to the domain name server.

3. The method of claim 2, wherein sending the new value for the dynamic IP address to a registrar comprises calling the registrar's update process for sending the new value for the dynamic IP address.

4. The method of claim 1, wherein a password is used to authenticate the message server to the domain name service.

5. The method of claim 1, wherein an "A" record is updated.

6. In a messaging system including a messaging server, a computer program product for implementing a method of the messaging server maintaining a domain name server record for a domain name of the message server, the domain name having dynamic IP address, wherein the value of the dynamic IP address can change causing the DNS record for the domain to be incorrectly mapped to a computer system other than the messaging server, the computer program product comprising one or more computer storage media having stored thereon computer executable instructions that, when executed by a processor, cause the messaging server to perform the following:

determine that the value of the dynamic IP address for the domain is no longer appropriately mapped to the domain name corresponding to the message server, including:

identify the domain name corresponding to the message server;

send a connection request addressed to the domain name, the connection request sent to the domain name to determine if the message server receives back the connection request, receiving back the connection request indicating that a previously assigned value for the dynamic IP address is appropriately mapped to the domain name in the DNS record for the domain name, sending the connection request being an attempt by the message server to send the connection request to the message server itself to determine if the previously assigned value assigned to the dynamic IP address has changed; and after a predetermined time without receiving the connection request at the message server, determine that the previously assigned value of the dynamic IP address corresponding to the domain name has changed;

determine a new value for the dynamic IP address corresponding to the domain name;

send the new value for the dynamic IP address to a registrar for updating the DNS record for the domain name such that messages are appropriately routed to the message server when messages are sent to the domain name, the registrar previously selected from among a plurality of registrars retrieved by an automatic configuration tool from a centralized database, the centralized database for a top-level domain in which the domain name is included.

7. The computer program product of claim 6, wherein sending the new value for the dynamic IP address to a registrar comprises sending the new IP address to a registrar, which routes the IP address to the domain name server.

8. The method of claim 7, wherein sending the new value for the dynamic IP address to a registrar comprises calling the registrar's update process for sending the new value for the dynamic IP address.

9. The computer program product of claim 6, wherein a password is used to authenticate the message server to the domain name service.

10. The computer program product of claim 6, wherein an "A" record is updated.

* * * * *